(12) United States Patent
Ferrell

(10) Patent No.: US 11,173,817 B2
(45) Date of Patent: Nov. 16, 2021

(54) VENTILATED CHILD CAR SEAT SYSTEM

(71) Applicant: Erica Ferrell, Savannah, GA (US)

(72) Inventor: Erica Ferrell, Savannah, GA (US)

( * ) Notice: Subject to any disclaimer, the term of this patent is extended or adjusted under 35 U.S.C. 154(b) by 0 days.

(21) Appl. No.: 16/591,082

(22) Filed: Oct. 2, 2019

(65) Prior Publication Data

US 2020/0108754 A1    Apr. 9, 2020

Related U.S. Application Data

(60) Provisional application No. 62/740,483, filed on Oct. 3, 2018.

(51) Int. Cl.
*B60N 2/56* (2006.01)
*B60N 2/28* (2006.01)

(52) U.S. Cl.
CPC ......... *B60N 2/5664* (2013.01); *B60N 2/2821* (2013.01)

(58) Field of Classification Search
None
See application file for complete search history.

(56) References Cited

U.S. PATENT DOCUMENTS

| 4,366,587 A * | 1/1983 | Takada | B60N 2/2854 |
| | | | 297/216.11 |
| 9,265,356 B2 * | 2/2016 | Glazman | A47C 31/007 |
| 10,640,019 B1 * | 5/2020 | St. Onge | B60N 2/5657 |
| 11,064,815 B2 * | 7/2021 | Webb | B60N 2/2866 |
| 2010/0125949 A1 * | 5/2010 | Stebbing | B60N 2/5657 |
| | | | 5/423 |
| 2014/0008954 A1 * | 1/2014 | Ramteke | B60N 2/2887 |
| | | | 297/256.16 |
| 2014/0353953 A1 * | 12/2014 | Jiang | B60N 2/2884 |
| | | | 280/748 |
| 2016/0039319 A1 * | 2/2016 | Zhang | B60N 2/2872 |
| | | | 297/216.11 |
| 2016/0059748 A1 * | 3/2016 | Cohen | B60N 2/2806 |
| | | | 297/183.7 |
| 2018/0072205 A1 * | 3/2018 | Suarez | B60N 2/5635 |
| 2018/0186254 A1 * | 7/2018 | Chen | B60N 2/2875 |
| 2019/0054844 A1 * | 2/2019 | Chen | B60N 2/2806 |
| 2020/0079249 A1 * | 3/2020 | Anderson | B60N 2/2821 |
| 2020/0101876 A1 * | 4/2020 | Cui | B60N 2/2872 |
| 2021/0214032 A1 * | 7/2021 | Nordangård | B62J 1/16 |

FOREIGN PATENT DOCUMENTS

EP    1810872 A1 *   7/2007   ........... B60N 2/2866

* cited by examiner

*Primary Examiner* — David E Allred

(74) *Attorney, Agent, or Firm* — Boudwin Intellectual Property; Daniel Boudwin

(57) ABSTRACT

A ventilated child car seat system. The system includes a child car seat attachable to a base, which is securable to a seat of a vehicle. The seat comprises a cushioned seat portion affixed to a frame. The frame includes a canopy and a handle affixed thereto. The frame includes several pluralities of air vents positioned thereon, and the base also includes several pluralities of air vents positioned thereon. The air vents facilitate air flow therethrough for cooling a baby laying therein, and in this manner the system prevents the baby from overheating in the vehicle.

9 Claims, 5 Drawing Sheets

VENTILATED CHILD CAR SEAT SYSTEM

CROSS REFERENCE TO RELATED APPLICATIONS

This application claims priority under 35 U.S.C. § 119(e) to U.S. Provisional Application No. 62/740,483 filed on Oct. 3, 2018. The above identified patent application is incorporated by reference herein in its entirety to provide continuity of disclosure.

BACKGROUND OF THE INVENTION

The present invention relates to a ventilated child car seat system for ventilating a child in a car seat; the system comprises a plurality of air vents to facilitate air flow therethrough to cool a baby in the car seat and prevent overheating of the baby.

Many babies receive inadequate ventilation when positioned in a car seat, which may be due to insulation of both the baby's clothing and a padding of the car seat, and a temperature of an interior of a vehicle in which the car seat is placed. In such circumstances, the baby may overheat, even if the baby is sweating, because of the inadequate ventilation. Possible solutions to prevent the baby from overheating include operating an air conditioning of the vehicle at a high rate of airflow, so as to cool those portions of the baby that are not insulated, but this is not advantageous because other individuals in the vehicle may then become too cold as a result of the air conditioning.

Therefore, there is a need in the art for a ventilated child car seat system that prevents babies from overheating when positioned in a car seat of the system. The present invention addresses this unmet need.

Devices have been disclosed in the art that relate to child car seat systems. These include devices that have been patented and published in patent application publications. These devices are often unable to effectively prevent a baby from overheating when positioned therein. In view of the devices disclosed in the art, it is submitted that there is a need for an improvement to existing child car seat systems. In view of the present disclosure, it is submitted that the present invention substantially diverges in structural and functional elements from devices in the art, and substantially fulfills an unmet need.

SUMMARY OF THE INVENTION

In view of the disadvantages inherent in the known types of child car seat systems in the art, the present invention provides a new and improved ventilated child car seat system, wherein the same can be utilized for providing improved ventilation to a baby positioned within a seat of the system, and thereby prevent the baby from overheating.

It is therefore an object of the present invention to provide a child car seat system for ventilating a baby positioned within a child car seat of the system.

In one aspect, the invention provides a ventilated child car seat system, comprising a child car seat attachable to a base. The base is securable to a seat of a vehicle. In addition, the child car seat comprises a cushioned seat portion affixed to a frame, and each of the child car seat and the base comprises a plurality of air vents positioned thereon, such that the pluralities of air vents facilitate air flow therethrough. In this manner, a baby positioned within the cushioned seat portion of the child car seat receives ventilating air flowing thereto, and the baby is able to effectively maintain his or her body temperature and overheating of the baby is prevented.

In another aspect, the invention provides a ventilated child car seat system, comprising a child car seat attachable to a base. The base is securable to a seat of a vehicle, and the child car seat comprises a cushioned seat portion affixed to a frame. Each of the child car seat and the base comprises a plurality of air vents positioned thereon, such that the pluralities of air vents facilitate air flow therethrough. In addition, the frame of the child car seat comprises the plurality of air vents positioned thereon, and the plurality of air vents of the base comprises a plurality of air vents positioned on a lower side of the base. In such embodiments the plurality of air vents of the lower side of the base facilitate air flow upward therethrough, and due to the frame having the plurality of air vents thereon, the baby in the cushioned seat portion is effectively cooled and overheating is prevented.

In embodiments, the frame comprises a canopy and a handle affixed thereto, such that the canopy is configured to cover the cushioned seat portion, and such that the handle is configured to facilitate carrying of the child car seat. In embodiments, the canopy is expandable to cover the cushioned seat portion and retractable to expose the cushioned seat portion, and the handle comprises a left frame attachment portion opposite a right frame attachment portion, with an arcuate member therebetween. In this manner, the child car seat can be effectively carried, moved, adjusted, transported, and positioned within a vehicle before, during, or after use of the system.

In embodiments, the plurality of air vents of the frame comprises a plurality of air vents positioned on a forward side of the frame, and a plurality of air vents positioned on a rearward side of the frame. In such embodiments, the forward and/or the rearward plurality of air vents of the frame accept air flow therethrough, such as from a window of the vehicle during movement of the vehicle, or conditioned air from an air conditioning system of the vehicle. In this manner, because placement of the system within the vehicle may generally result in the forward side of the frame being proximal to the source of the air flow, the baby is effectively cooled.

In embodiments, the plurality of air vents of the frame comprises a plurality of air vents positioned on a left side of the frame, and a plurality of air vents positioned on a right side of the frame. In such embodiments, a cross-flow of air inside the vehicle may more effectively cool the baby positioned within the system. In embodiments, the plurality of air vents of the left side of the frame comprises a left forward plurality of air vents and a left rearward plurality of air vents, and the plurality of air vents of the right side of the frame comprises a right forward plurality of air vents and a right rearward plurality of air vents. In this manner, the left side of the frame and the right side of the frame may be maximally ventilated to improve air flow through the system to cool the baby.

In embodiments, the plurality of air vents of the base comprises a plurality of air vents positioned on a forward side of the base, and a plurality of air vents positioned on a rearward side of the base. In this manner, when the child car seat of the system is affixed to the base of the system, the forward vents of the base may align with forward vents of the frame of the child car seat, and the rearward vents of the base may align with rearward vents of the frame of the child car seat. In this manner, air effectively flows through both the base and the frame of the system, and the baby is effectively cooled and overheating of the baby is prevented.

In embodiments, the plurality of air vents of the base comprises a plurality of air vents positioned on a left side of the base, and a plurality of air vents positioned on a right side of the base. In this manner, upon attachment of the child car seat of the system to the base of the system, the left and right side air vents of the frame of the child car seat may be positioned above or adjacent to the left and right side air vents of the base. In this manner, air flow through the system may be maximized and the baby may be effectively cooled.

Another object of the present invention is to provide a ventilated child car seat system that may be readily manufactured from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1:
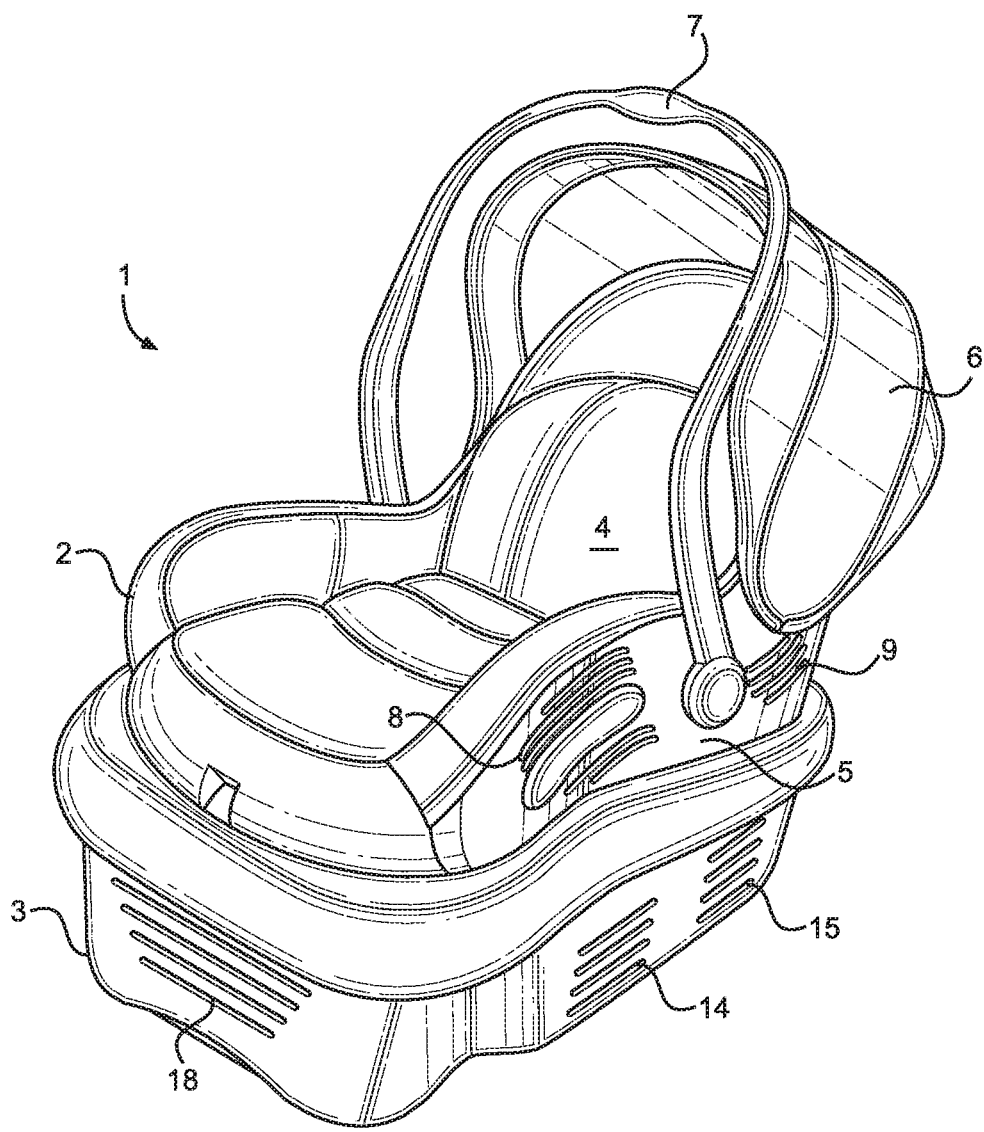
FIG. 1 depicts a perspective view of an exemplary ventilated child car seat system, with a child car seat of the system attached to a base of the system.

Reference is made herein to the attached drawings. Like reference numerals are used throughout the drawings to depict like or similar elements of the invention. The figures are intended for representative purposes only and should not be considered limiting in any respect.

Figure 2:
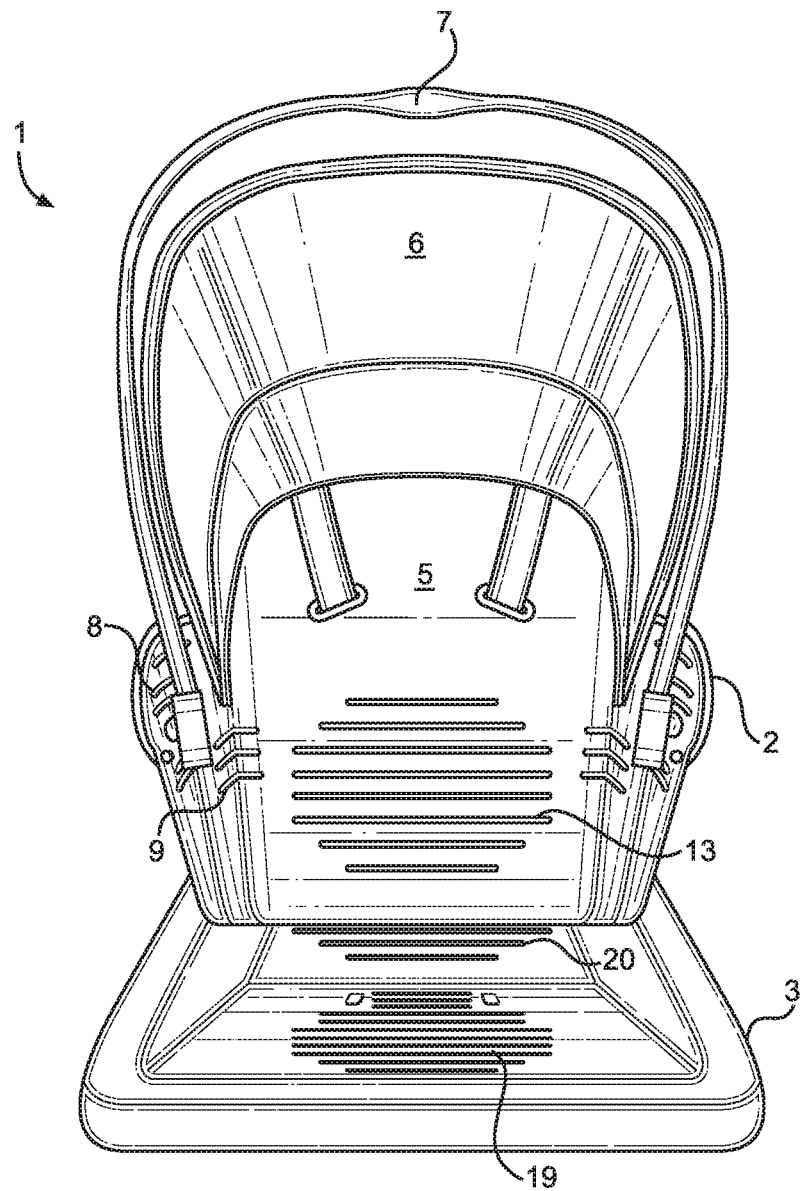
FIG. 2 depicts a rear side perspective view of the ventilated child car seat system, with the seat adjacent to the base.
Figure 3:
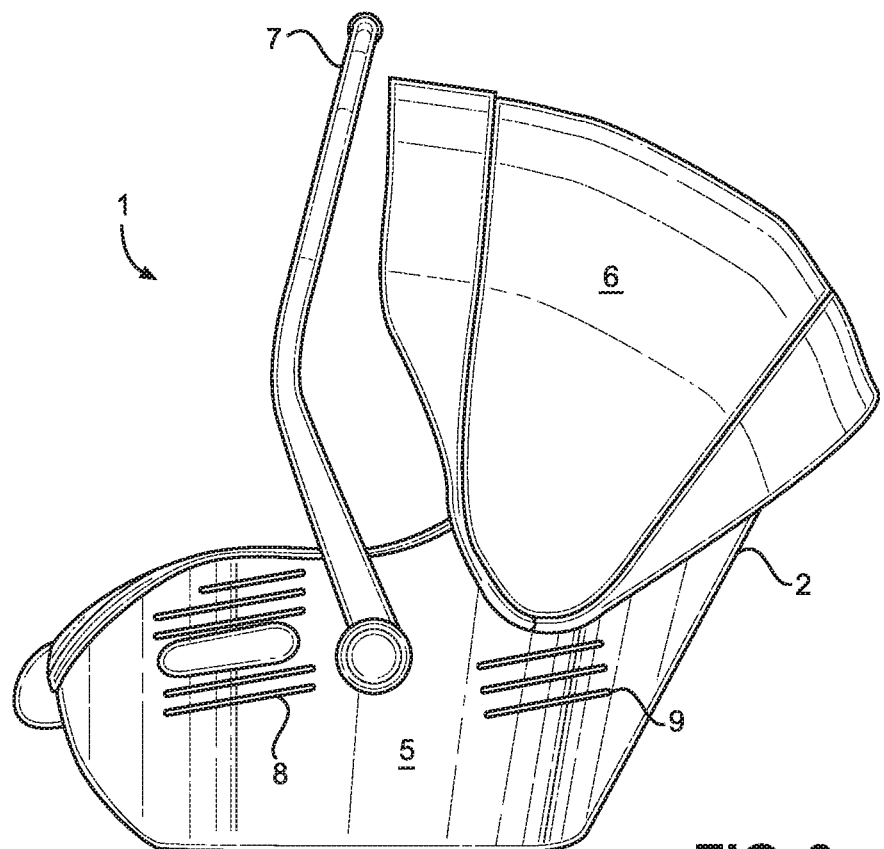
FIG. 3 depicts a left side perspective view of the seat of the system.
Figure 4:
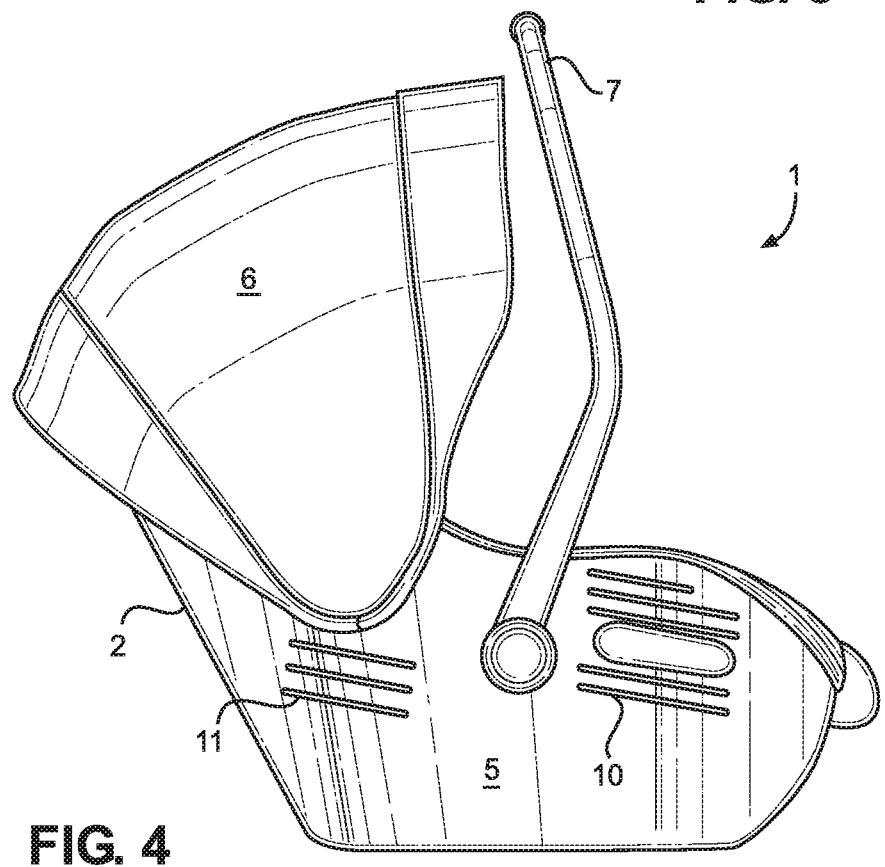
FIG. 4 depicts a right side perspective view of the seat of the system.
Figure 5:
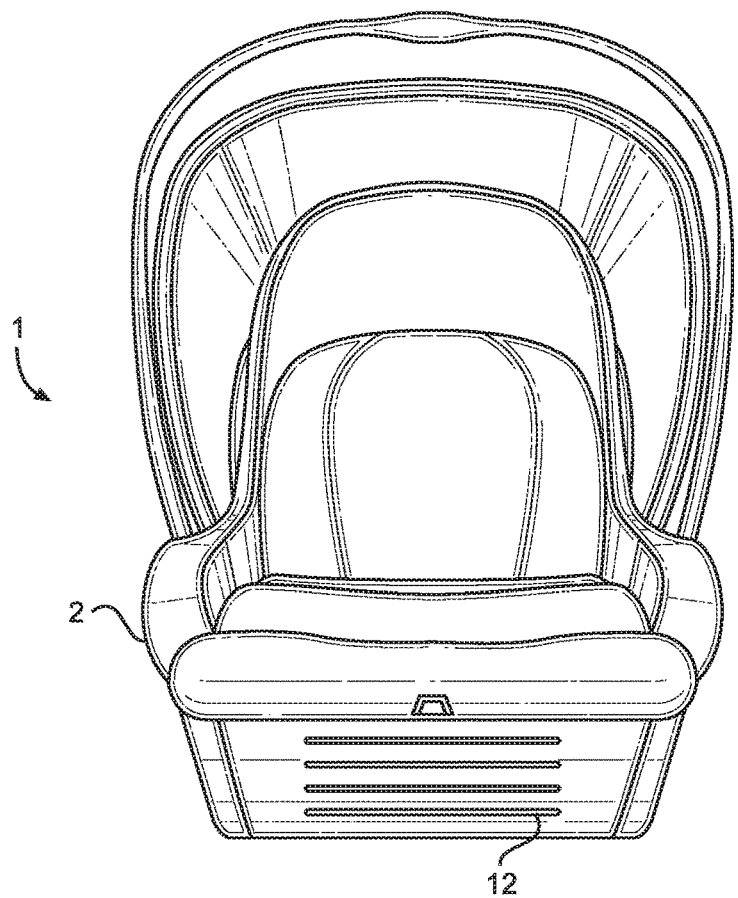
FIG. 5 depicts a front side perspective view of the seat of the system.
Figure 6:
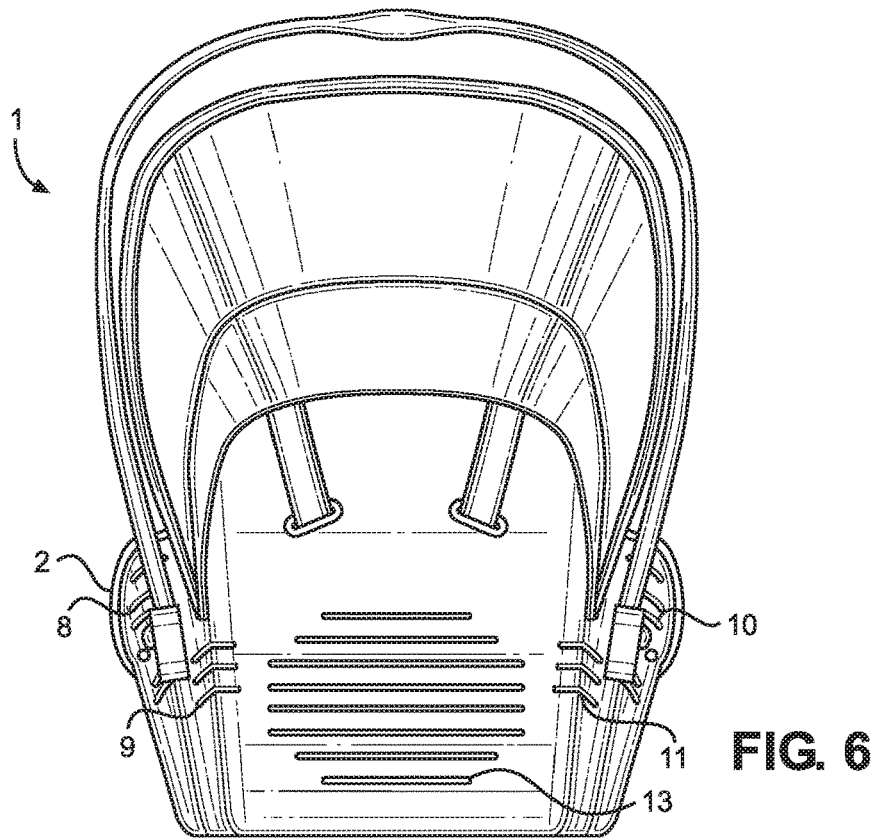
FIG. 6 depicts a rear side perspective view of the seat of the system.

Referring now to FIGS. 1 and 2, there are depicted a perspective view (FIG. 1) and a rear side perspective view (FIG. 2) of an exemplary ventilated child car seat system, with a seat attached (FIG. 1) or adjacent (FIG. 2) to a base. A ventilated child car seat system 1 comprises a child car seat 2 attachable to a base 3. The base 3 is securable to a seat of a vehicle, such as by way of a seat belt or other securement fastener system. The child car seat 2 comprises a cushioned seat portion 4 affixed to a frame 5, and each of the child car seat 2 and the base 3 comprises a plurality of air vents (e.g., 8, 9, 14, 15, 18 of FIGS. 1, and 8, 9, 13, 19, and 20 of FIG. 2). The pluralities of air vents are configured to facilitate air flow therethrough, such that air readily flows through the child car seat 2 and the base 3 to cool a baby laying within the cushioned seat portion 4. In this manner, the baby does not overheat and his or her body temperature is maintained.

In the shown embodiment, the frame 5 comprises a canopy 6 and a handle 7 affixed thereto, such that the canopy 6 is configured to cover the cushioned seat portion 4, and such that the handle 7 is configured to enable an individual, such as a caretaker of the baby, to carry the child car seat 2 and/or the system 1. In addition, in the shown embodiment, the canopy 6 may be configured to expand to cover the cushioned seat portion 4 and retract to expose the cushioned seat portion 4, as needed. The handle 7 comprises a left frame attachment portion (i.e., the frame attachment portion depicted in FIG. 1) and a right frame attachment portion, positioned opposite the left frame attachment portion, with an arcuate member therebetween. The left and right frame attachment portions may be pivotally attached to the frame to enable adjustment of an angle of the handle 7 with respect to the frame 5. The arcuate member includes a grip positioned at an apex thereof, such that the caretaker can grasp the grip of the handle 7 to carry or position the system 1 and/or the child car seat 2 before, during, or after use. In the shown embodiment, a diameter of the grip of the handle 7 is greater than a diameter of the arcuate member, so as to facilitate grasping of the handle 7 by the caretaker. In this manner, the caretaker can easily maneuver with the child car seat 2 and baby therein.

Referring now to FIGS. 3-6, there are depicted several perspective views of the seat of the system. In the shown embodiment, the plurality of air vents of the frame 5 comprises a plurality of air vents 12 positioned on a forward side of the frame 5 of the child car seat 2 of the system 1, and a plurality of air vents 13 positioned on a rearward side of the frame 5. In such embodiments, the forward and/or the rearward plurality of air vents (12, 13) of the frame 5 accept or facilitate air flow therethrough, such as an air flow from a window of the vehicle or an air conditioning of the vehicle. In this manner, because placement of the system 1 within the vehicle may generally result in the forward side of the frame 5 being proximal to the source of the air flow, the baby is effectively cooled.

In the shown embodiment, the plurality of air vents of the frame 5 comprises a plurality of air vents (8, 9) positioned on a left side of the frame 5, and a plurality of air vents (10, 11) positioned on a right side of the frame 5. In such embodiments, a cross-flow of air inside the vehicle may effectively cool the baby within the system 1. In the shown embodiment, the plurality of air vents of the left side of the frame 5 comprises a left forward plurality of air vents 8 and a left rearward plurality of air vents 9, and the plurality of air vents of the right side of the frame 5 comprises a right forward plurality of air vents 10 and a right rearward plurality of air vents 11. In this manner, the left and right sides of the frame 5 may be maximally ventilated to improve air flow through the system 1 to cool the baby.

Figure 7:
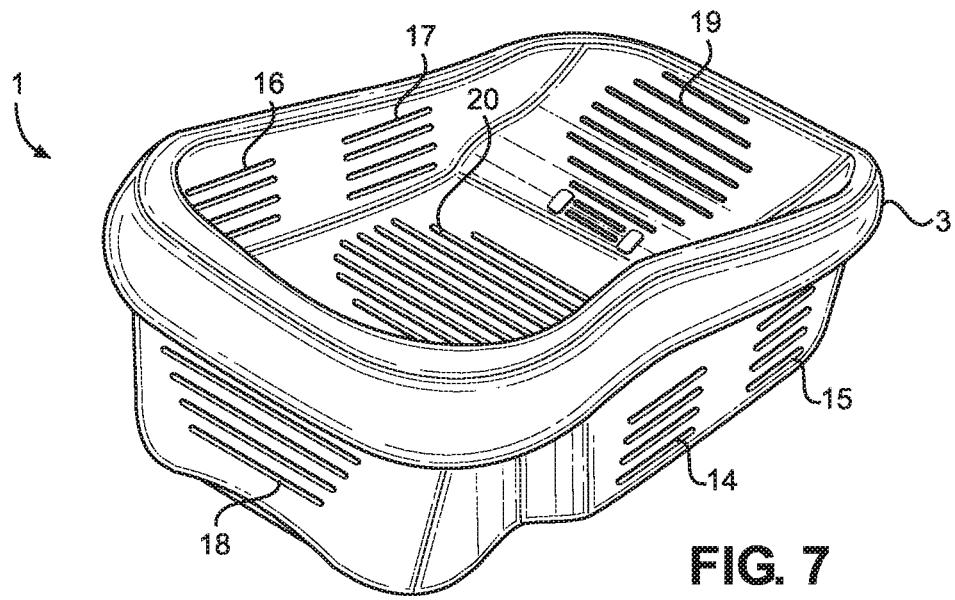
FIG. 7 depicts a front left perspective view of the base of the system.
Figure 8:
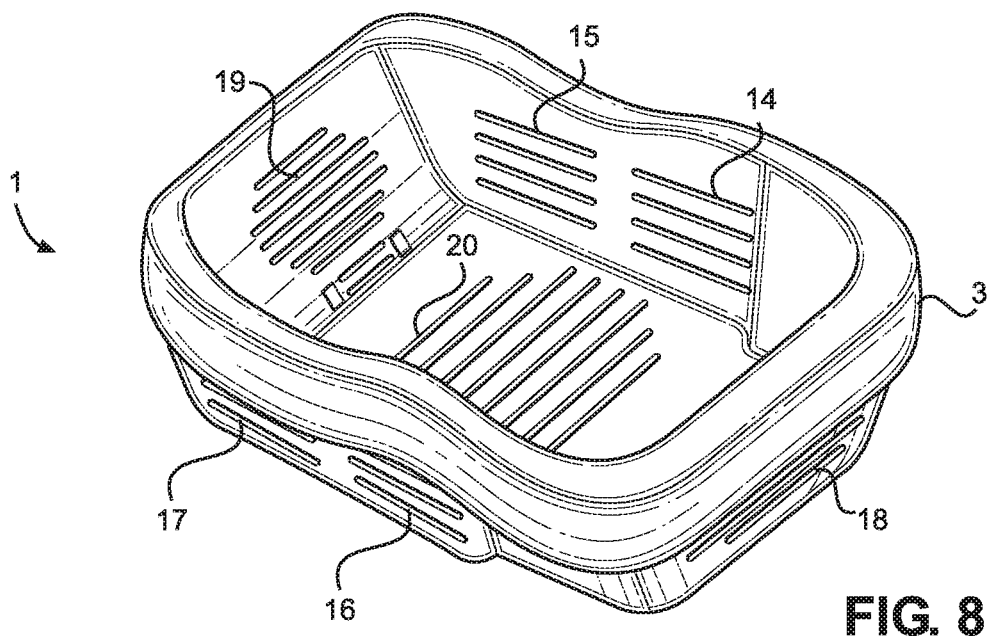
FIG. 8 depicts a front right perspective view of the base of the system.

Referring now to FIGS. 7 and 8, there are depicted perspective views of the base of the system. In the shown embodiment, the plurality of air vents of the base 3 of the system 1 comprises a plurality of air vents 18 positioned on a forward side of the base 3, and a plurality of air vents 19 positioned on a rearward side of the base 3. In this manner, when the child car seat of the system 1 is affixed to the base 3 of the system 1, the forward vents 18 of the base 3 may align with forward vents of the frame of the child car seat, and the rearward vents 19 of the base may align with rearward vents of the frame of the child car seat. In this manner, air effectively flows through both the base 3 and the frame of the system 1, and the baby is effectively cooled and overheating of the baby is prevented.

In the shown embodiment, the plurality of air vents of the base 3 comprises a plurality of air vents (14, 15) positioned on a left side of the base 3, and a plurality of air vents (16, 17) positioned on a right side of the base 3. In this manner, upon attachment of the child car seat of the system 1 to the base 3 of the system 1, the left and right side air vents of the frame of the child car seat may be positioned above or adjacent to the left (14, 15) and right (16, 17) side air vents of the base 3. In this manner, air flow through the system 1 may be maximized and the baby may be effectively cooled.

In the shown embodiment, the plurality of air vents of the left side of the base 3 comprises a left forward plurality of air vents 14 and a left rearward plurality of air vents 15, and the plurality of air vents of the right side of the base 3 comprises a right forward plurality of air vents 16 and a right rearward plurality of air vents 17. In this manner, the left and right sides of the base 3 may be maximally ventilated to improve air flow through the system 1 to cool the baby.

In addition, in the shown embodiment, the plurality of vents of the base 3 comprises a plurality of air vents 20 positioned on a lower side of the base 3. In such embodiments, the plurality of air vents 20 facilitate air flow upward therethrough, and due to the frame having the plurality of air vents thereon, the baby in the cushioned seat portion is effectively cooled and overheating is prevented. In this manner, both the base and the child car seat (i.e., the frame) of the system 1 are configured to maximize air flow to maintain body temperature of the baby therein, without sacrificing structural integrity of any component of the system 1. In this manner, the system 1 is safe to use in a vehicle to cool and protect the baby positioned therein during use.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. A ventilated child car seat system, comprising:
  a child car seat removably attached to a base, wherein the base is securable to a seat of a vehicle, wherein the child car seat comprises a cushioned seat portion affixed to a frame;
  wherein each of the child car seat and the base comprises a plurality of air vents positioned thereon, wherein the pluralities of air vents facilitate air flow therethrough;
  wherein the frame of the child car seat comprises a left forward plurality of air vents and a left rearward plurality of air vents positioned on a left side of the frame, a right forward plurality of air vents and a right rearward plurality of air vents positioned on a right side of the frame, a forward plurality of air vents, and a rearward plurality of air vents;
  wherein the base comprises a forward plurality of air vents positioned on a forward side of the base, a left forward plurality of air vents, a left rearward plurality of air vents, a right rearward plurality of air vents, a right forward plurality of air vents, a rearward plurality of air vents, and a lower side plurality of air vents positioned on a lower side of the base; and
  wherein the child car seat is configured to attach to the base such that each of pluralities of separately defined air vents on left, right, front, and rear sides in the child car seat are aligned in at least one of a vertical and a horizontal direction with respective pluralities of separately defined air vents on left, right, front and rear sides in the base when the child car seat is attached to the base.

2. The system of claim 1, wherein the frame comprises a canopy and a handle affixed thereto, wherein the canopy is configured to cover the cushioned seat portion, wherein the handle is configured to facilitate carrying of the child car seat.

3. The system of claim 2, wherein the canopy is expandable to cover the cushioned seat portion and retractable to expose the cushioned seat portion; wherein the handle comprises a left frame attachment portion opposite a right frame attachment portion and an arcuate member therebetween.

4. The ventilated child car seat system of claim 1, wherein each plurality of air vents of the separately defined pluralities of air vents comprises a plurality of elongated openings in parallel alignment with each other.

5. A ventilated child car seat system, comprising:
  a child car seat removably attached to a base, wherein the base is securable to a seat of a vehicle, wherein the child car seat comprises a cushioned seat portion affixed to a frame;
  wherein each of the child car seat and the base comprises a plurality of air vents positioned thereon, wherein the pluralities of air vents facilitate air flow therethrough;
  wherein the plurality of vents of the child car seat consists of a left forward plurality of air vents and a left rearward plurality of air vents positioned on a left side of the frame, a right forward plurality of air vents and a right rearward plurality of air vents positioned on a right side of the frame, a forward plurality of air vents, and a rearward plurality of air vents;
  wherein the plurality of vents of the base consists of a forward plurality of air vents positioned on a forward side of the base, a left forward plurality of air vents, a left rearward plurality of air vents, a right rearward plurality of air vents, a right forward plurality of air vents, a rearward plurality of air vents, and a lower side plurality of air vents positioned on a lower side of the base; and
  wherein the child car seat is configured to attach to the base such that each of pluralities of separately defined air vents on left, right, front, and rear sides in the child car seat are aligned in at least one of a vertical and a horizontal direction with respective pluralities of separately defined air vents on left, right, front and rear sides in the base when the child car seat is attached to the base.

6. The system of claim 5, wherein the frame comprises a canopy and a handle affixed thereto, wherein the canopy is configured to cover the cushioned seat portion, wherein the handle is configured to facilitate carrying of the child car seat.

7. The system of claim 6, wherein the canopy is expandable to cover the cushioned seat portion and retractable to expose the cushioned seat portion; wherein the handle comprises a left frame attachment portion opposite a right frame attachment portion and an arcuate member therebetween.

8. The ventilated child car seat system of claim 5, wherein each plurality of air vents of the separately defined pluralities of air vents consists of a plurality of elongated openings in parallel alignment with each other.

9. A ventilated child car seat system, consisting of:
a child car seat attachable to a base, wherein the base is securable to a seat of a vehicle, wherein the child car seat comprises a cushioned seat portion affixed to a frame;
wherein each of the child car seat and the base comprises a plurality of air vents positioned thereon, wherein the pluralities of air vents facilitate air flow therethrough;
each plurality of air vents of the separately defined pluralities of air vents grouped in a linear, parallel arrangement;
wherein the frame of the child car seat comprises the plurality of air vents of the child car seat positioned thereon;
wherein the plurality of air vents of the frame comprises a forward plurality of air vents positioned on a forward side of the frame, and a rearward plurality of air vents positioned on a rearward side of the frame;
wherein the plurality of air vents of the frame comprises a left side plurality of air vents positioned on a left side of the frame, and a right side plurality of air vents positioned on a right side of the frame;
wherein the plurality of air vents of the base comprises a lower side plurality of air vents positioned on a lower side of the base;
wherein the plurality of air vents of the base comprises a forward plurality of air vents positioned on a forward side of the base, and a rearward plurality of air vents positioned on a rearward side of the base;
wherein the plurality of air vents of the base comprises a left side plurality of air vents positioned on a left side of the base, and a right side plurality of air vents positioned on a right side of the base; and
wherein the child car seat is configured to attach to the base such that each of pluralities of separately defined air vents on left, right, front, and rear sides in the child car seat are aligned in at least one of a vertical and a horizontal direction with respective pluralities of separately defined air vents on left, right, front and rear sides in the base when the child car seat is attached to the base.

* * * * *